United States Patent
Biedermann

(10) Patent No.: US 10,180,348 B2
(45) Date of Patent: Jan. 15, 2019

(54) METHOD AND DEVICE FOR DETECTING INFRASOUND

(71) Applicant: Petra Sonja Biedermann, Tennwil (CH)

(72) Inventor: Petra Sonja Biedermann, Tennwil (CH)

(*) Notice: Subject to any disclaimer, the term of this patent is extended or adjusted under 35 U.S.C. 154(b) by 281 days.

(21) Appl. No.: 14/896,262

(22) PCT Filed: Jun. 4, 2014

(86) PCT No.: PCT/IB2014/061947
§ 371 (c)(1),
(2) Date: Dec. 18, 2015

(87) PCT Pub. No.: WO2014/195883
PCT Pub. Date: Dec. 11, 2014

(65) Prior Publication Data
US 2016/0138965 A1    May 19, 2016

(30) Foreign Application Priority Data
Jun. 4, 2013  (DE) .................. 10 2013 105 726

(51) Int. Cl.
*G01H 17/00* (2006.01)
*G01H 9/00* (2006.01)

(52) U.S. Cl.
CPC .............. *G01H 9/00* (2013.01); *G01H 17/00* (2013.01)

(58) Field of Classification Search
CPC ................................. G01H 9/00; G01H 17/00
USPC .......................................................... 73/587
See application file for complete search history.

(56) References Cited

U.S. PATENT DOCUMENTS

| | | | |
|---|---|---|---|
| 3,048,075 A | 8/1962 | Wright | |
| 3,547,520 A | 12/1970 | Lee et al. | |
| 5,156,547 A * | 10/1992 | Bailey | A61C 17/005 433/125 |
| 6,499,675 B2 * | 12/2002 | Huang | B05B 7/066 239/421 |
| 7,042,801 B1 * | 5/2006 | Berg | G01V 1/00 324/323 |
| 7,079,449 B2 * | 7/2006 | Shook | G01V 1/306 367/38 |

(Continued)

FOREIGN PATENT DOCUMENTS

| | | | |
|---|---|---|---|
| CN | 102213611 | * | 10/2011 |
| CN | 205597895 | * | 9/2016 |

(Continued)

OTHER PUBLICATIONS

PCT/IB2014/061947 International Search Report dated Oct. 22, 2014.

(Continued)

*Primary Examiner* — J M Saint Surin
(74) *Attorney, Agent, or Firm* — Wagenknecht IP Law Group PC

(57) ABSTRACT

A method and an apparatus for detecting infrasound that determines the direction and position of an infrasound source.
The detection method includes a container exposed to an infrasound source and partially filled with a mist (N) which is embedded in a carrier medium so that the resulting pressure change over time results in the formation of a directed front at the mist surface that can be optically detected.

19 Claims, 4 Drawing Sheets

(56) References Cited

U.S. PATENT DOCUMENTS

| | | | | |
|---|---|---|---|---|
| 7,134,342 B1 * | 11/2006 | Mueller | ................ | G01V 1/181 |
| | | | | 73/514.16 |
| 8,164,746 B2 * | 4/2012 | Colle | ................ | G01N 21/9054 |
| | | | | 356/239.4 |
| 2011/0098950 A1 * | 4/2011 | Carr | ................ | G01H 3/00 |
| | | | | 702/56 |
| 2011/0238314 A1 | 9/2011 | Qiang et al. | | |

FOREIGN PATENT DOCUMENTS

| | | | |
|---|---|---|---|
| DE | 102005053038 A1 | | 5/2007 |
| EP | 1835308 | * | 9/2007 |
| FR | 2822392 A1 | | 9/2002 |
| JP | 4019182 | * | 12/2007 |

OTHER PUBLICATIONS

Svirkunov and Kozlov. "Absorption of infrasonic waves in a cloudy medium." Izvestiya, Atmospheric and Oceanic Physics, Dec. 4, 2012, 48(6):625-630, Nauka/Interperiodica, MO.

* cited by examiner

METHOD AND DEVICE FOR DETECTING INFRASOUND

TECHNICAL FIELD

The invention relates to a method and an apparatus for the detection of infrasound. In particular, the invention relates to a method and an apparatus by means of which the direction and optionally the position of an infrasound source can be determined.

BACKGROUND OF THE INVENTION

Sound waves which lie below the limit which is perceptible by the human ear of approximately 16 Hz but above natural barometric variations are called infrasound. The lower the frequency is, the more unhindered the infrasound waves propagate. Infrasound which is transmitted through the air can be detected even in a distance of several kilometers from a source; in water, the distance can even be a multiple thereof.

Unnatural resources of infrasound are for example supersonic airplanes, explosions (e.g. also due to tests of weapons), but also industrial plants which use machines, as well as air handling systems. Also wind generators whose moving rotor blades induce a compression of the air between themselves and the tower during passage of the lowest position produce rhythmical low-frequency vibrations. Further, heavy goods vehicle traffic on bridges can generate infrasound. Further sources are e.g. movements of boats or rough sea.

An interest exists for simple, effective measurement methods for infrasound, since it was repeatedly reported that infrasound would have negative effects on well-being and health. But also the possibility of damages of buildings because of permanent infrasound exposure requires its determination.

However, measurement of such sound waves is difficult, because in particular in nature, manifold interferences occur which overlap the infrasound and impede the identification of a source. This can e.g. be wind, air handling systems, trucks, trains, flowing waters, or rain.

While common acoustic sound pressure microphones do extend, if at all, then not far into the infrasound region, pressure sensors are usually not sensitive enough. Further, measurement by means of special devices such as micro barometers is expensive.

SUMMARY OF THE INVENTION

It is the object of the invention to provide a cost-effective detection method for infrasound, a locality determination method for infrasound sources, as well as an apparatus for carrying out these detection- or locality determination methods, respectively.

The object is solved by a detection method for detecting infrasound at a measurement site, the method comprising: exposing a remote infrasound source to a container partially filled with a mist which is embedded in a carrier medium to change pressure over time, wherein the pressure change forms a directed front at a mist surface and optically detecting the directed front at the mist surface. It is also solved by a detection apparatus for detecting infrasound, comprising a container which is partially filled with a mist (N) embedded in a carrier medium such that a mist surface is present on which, when exposed to a remote infrasound source (3), over time, an optically detectable directed front (4) can be formed which depends on the infrasound event. Advantageous embodiments are contained in the subsequent description, as well as the figures.

In the following, at first, the detection method according to the invention is described. Then follows a description of the locality determination method which uses this detection method, as well as a description of apparatuses by means of which this detection- or locality determination method can be carried out, respectively.

The detection method serves for the detection of infrasound at a measurement site. According to the invention, a container is being partially filled in a way with a mist which is embedded in a carrier medium such that a mist surface is present. The latter is exposed to an infrasound source. Preferably, the infrasound source is located substantially in the same plane as the mist surface. According to the invention, the pressure change over time which arises from the arriving infrasound wave results in the formation of an optically detectable directed front at the mist surface.

As a carrier medium, in particular, a gas such as air, and as mist, preferably droplets of water, is possible. These can be generated by means of known methods. Due to the fact that the droplets sink to the bottom and accumulate at the floor of the container, the aforementioned mist surface is formed. However, the mist can also consist of solid state particles (smoke) or the same. Due to mixing with the carrier medium, the particles float within the same, wherein after a certain time, said mist surface must form; the mass of the particles must therefore not entirely be compensated by means of uplift within the carrier medium.

In principle, particles in liquids can produce comparable results, which is why herein, according to the definition, the term of the “mist” and of the carrier medium shall be broadly interpreted. In general, and in particular in cases when the liquid is used as a carrier medium, the term “phase interface” instead of “mist surface” can also be used.

By means of the detection method according to the invention, otherwise hardly, and only by means of great efforts, detectable infrasound events can be made visible, and thus detectable. The detection method is simple and allows an at least qualitative detection of infrasound. Particularly the direction in which the infrasound source lies can be determined, since the directed front is approximately perpendicular to the direction of arrival of the infra sound.

It is therefore also advantageous if the planes of the mist surface and the infrasound source do not differ too much from each other. Nevertheless, the detection method can also be used when the infrasound source is located above the detection apparatus, for example. However, then, the front runs not substantially in parallel to the mist surface, but approximately in vertical direction, which is optically less well detectable. However, because of gravity, the aforementioned phase interface will always form in parallel to the ground surface.

It is even possible to use the method according to the invention in the context of flying over suspected infrasound sources, as experiments have shown.

The invention allows in a cost-effective manner the detection of infrasound waves since only simple components are necessary for carrying out the detection method, as will be described further below.

According to a preferred embodiment, the mist surface is illuminated in order to improve the optical detectability of the same. In particular, a lateral arrival of light onto the mist surface allows for an improved detectability of the occurrence of the directed front, as long as the same runs from one side to the other, which is true at least in the case of approximately coplanar planes of mist surface and infra sound source.

By means of stroboscopic illumination, the propagation speed and/or height of the front can be visible more easily. These, in turn, can represent a measure for the intensity and/or frequency of the infrasound wave.

According to a preferred embodiment, the mist originates from a liquid that can be nebulized and is generated by means of a nebulizer which is arranged inside the container or at a wall thereof. Thus, the nebulizer is in direct or indirect contact with this liquid, wherein the liquid is preferably water.

Particularly preferred, the liquid is dark colored. This enhances the contrast between the mist surface which is typically perceived rather light, also because of the optional illumination, and the ground which is anyway irrelevant for the measurement, the latter being formed by the surface of the liquid and/or the ground of the container.

Preferably, the detection takes place over a certain period of time, i.e. does not consist of one individual snapshot at a certain time point.

One second can be regarded as the shortest time period. In a typical container having a diameter of 40 cm, the directed front requires approximately one to two seconds in order to cross the container. However, detection times of ten seconds up to two minutes are preferred. In this way, it is ensured that the complete transition of the front has been detected. Even time periods of several hours can be reasonable—in particular, when the infrasound arrives not continuously, but at times which are not foreseeable.

According to a further embodiment, the mist surface is recorded by means of a video camera.

Amongst others, this is a prerequisite for that the results of the detection can, preferably automatically, be analyzed with a computer. So, also without the presence of personnel during the actual recording of data, e.g. the frequency of the occurrence of sound events can be determined by looking in fast scroll for sound events at the screen subsequent to the detection.

In fact, recording of the variations of the mist surface effected by the directed front would be possible in other ways as well, e.g. by humidity sensors at the circumference of the inside of the container. However, using an off-the-shelf video camera, preferably having an integrated digital memory, is exceptionally cost-effective and simple to implement.

As long as the physical correlation between the behavior of the particles at the mist surface upon infrasound radiation can be calculated and, for example, are put down in a model, analyzing of the detection results is possible. But also by measuring known infrasound sources by means of other methods, storing these results in a memory, and subsequently comparing these results with the images of unknown sources, conclusions can be drawn regarding parameters such as frequency and/or intensity of the infrasound (so-called "table look-up").

Preferably, the images of the video camera are fed to an image processing device for calculating the direction, the strength, and/or the frequency of the infrasound. In this way, the manual optical observation of the mist surface can be omitted, and the detection is graded up to a quantitative and/or quantitative "measurement".

Alternatively, the calculation or the comparison, respectively, can take place manually or semi-automatically as well, for example by manually comparing the images, preferably using a computer.

In order to further increase the significance of the detection method according to the invention, according to one embodiment, a determination of the respective detection site takes place, for example by using a GPS device or also by manually determining the position on a map.

Also, a control of the natural air movements, for example by means of an anemometer, is advantageous. Wind direction and wind speed have an influence on the propagation direction and also on the propagation velocity as well (measured relatively to the ground).

Further, control of the barometric pressure, e.g. by means of a barometer, is advantageous as well.

It is clear that advantageously all these parameters can find their way into a manual or particularly preferred automatic analysis in order to further enhance the quality of the detection/measurement.

The detection method according to the invention can also advantageously be used to precisely determine the locality of an infrasound source. For such a locality determination method, a multitude of detections which take place as described before are carried out simultaneously or time-delayed at different sites, wherein the direction of the infrasound source is deduced from the position of the directed front of the respective detection result together with its according detection site.

The simultaneous detection is preferred, and in particular, if the infrasound source emits infrasound only temporarily. In other cases, the position of the infrasound source can be reconstructed also by means of a single detection apparatus which is sequentially transported to the different detection sites. By means of simple trigonometric calculation, the position of the detections sites can be deduced already with two, but however, preferably with at least three results stemming from different detection sites (which are also spaced apart sufficiently far away from one another). Helpful is a map of the surrounding into which the detection sites and the orientations of the directed fronts can be inscribed. As a matter of course, this process as well can entirely or partially be automated.

Particularly preferred, the detection sites are being arranged around an suspected infrasound source. In this way, the error of the locality detection can easily be minimized. If, however, the position of the infrasound source is initially unknown, its approximate position can be determined by means of a multitude of detections. Then, the exact position is determined by accordingly optimized detecting/measuring at optionally further detection sites.

Since the method according to the invention can be carried out also from the air, for example while flying over suspected infrasound sources, in this manner, an at least approximate locality determination can be performed time saving by carrying out locality- and time shifted detections.

For automation, the mist surfaces can be recorded by means of one or several video cameras and fed in an image processing device for the calculation of the direction of the infrasound source and/or the strength and/or the frequency of the infrasound at the respective detection site. Reference is made to the above explanations. In this way, a locality determination method is provided by means of which at least the position of the infra sound source, but preferably, also further parameters regarding the infrasound, at the respective location can conveniently be determined.

In the following, a supplement of the detection or locality determination method according to the invention is described by means of which the significance and conclusiveness of the detections or locality determinations carried out can further be improved.

For reasons of distinctness, in the following, "detection" denotes the result of a detection by means of the detection method according to the invention (mist surface). Accordingly, the "detection site" is presently the site where detecting is carried out by means of the method according to the invention as described above. In the contrary, "measurements" of a "measurement site" can also be present which are achieved by means of a measurement method that is different from, and supplementing, the detection method, as being subsequently described. A detection- and its corresponding measurement site can, but must not, be exactly identical.

Thus, in addition to the aforementioned detections by means of the mist surface, measurements by means of microphones which can detect a certain minimum frequency are carried out. The minimum frequency can e.g. be 3 Hz which typically corresponds to the lowest frequency that can be measured with sufficient precision by common microphones.

The first of the additional measurements takes place at a first measurement site which has a distance from the infrasound source approximately corresponding to the wavelength of said minimum frequency. In other words, the first measurement takes place in close proximity of the infrasound source, wherein it is clear that its position must at first be determined, the previously described method being preferably used therefor. Typically, this distance amounts to 100 meters (wavelength of sound of the frequency of 3 Hz), however, shorter or longer distances can be advantageous as well, e.g. 10 meters, 50 meters, 400 meters, or 500 meters.

At least one second additional measurement takes place at a second measurement site which is preferably located only a few, e.g. between 1 and 10, meters away from the respective corresponding measurement site. It should be noted that by means of the microphones it is however possible to actually "measure", which is why their sites are denoted as "measurement sites". The reason for the (even short) distance lies in the generation of noise, coming from an apparatus which is performing the method according to the invention, and thus having an interfering effect.

It is clear that also more than just one additional further measurement can take place. Preferably, for each additional detection site, according measurements at corresponding measurement sites are carried out.

According to the invention, the additional measurements consist of sound measurements which are carried out in the audible region and/or in the inaudible region at or above 3 Hz. This means that the additional measurements can also be carried out by microphones other than microphones which can already measure 3 Hz vibrations, such as e.g. microphones having a minimal frequency of 20 Hz. In general, however, lower frequencies are preferred.

The additional measurements are subsequently compared by means of fingerprint methods with respect to the time axis which is corrected with regard to these sound events. Accordingly, the sound events are analyzed only in the timescale, but not in the frequency region, and compared with one another. The comparison serves for enabling assignment of sound events at different measurement sites to the same sound-, and therefore, infrasound event. Experiments have surprisingly shown that infrasound events often involve harmonics in the audible region, which can be measured also in large distances—up to 10 km and more. "Corrected time axis" means in this context that both time axes of the measurements regarding both measurement sites are shifted against each other in such a way that the time shift which results from the different propagation time of the sound to both measurement sites disappears, so that the events on both time axes are synchronized with each other.

The term "fingerprint" commonly denotes the detection by way of filtering out common features of patterns, so that these can be assigned to one another. By the comparative acoustic recording of sound events, characteristic signal patterns evolve which show themselves e.g. by strength, grouping of signals and frequencies on the time axis. Therefore, a definite identification of e.g. a sound source becomes possible in that besides the infrasound detection according to the invention, additionally, a detection of the sound event corresponding to the infrasound event in the audible region (or just below its boundary) is carried out.

Particularly preferred, analysis of the measurement result takes place by automatic (computer-assisted) methods. Alternatively, a manual or semi-automatic analysis can take place as well (see above).

Preferably, the data of the infrasound detection and the sound measurements are complemented with an exact and non-manipulable time stamp upon recording.

The invention relates also to a detection apparatus for carrying out the detection method according to the invention.

A detection apparatus according to the invention comprises a container which is partially filled in a way with a mist being embedded in a carrier medium such that a mist surface is present on which, when exposed to an infrasound source, over time, an optically detectable directed front can be formed which depends on the infrasound event.

The container is preferably round and preferably has a diameter of 20 to 50 centimeters. Its depth lies preferably between 2 and 20 centimeters. The inside walls of the container are colored dark, and preferably black, in order to increase the contrast to the mist surface.

The carrier medium is preferably a gas such as in particular air. Alternatively, a liquid can serve as carrier medium as well; in order to avoid repetitions, reference is made to the above explanations.

Such a detection apparatus can be cost effectively fabricated and is robust, since for its production, no expensive or delicate components must be used.

Preferably, the detection apparatus comprises an illumination by means of which the mist surface can be illuminated. In this way, the visibility of the directed front which forms due to infrasound exposure can be improved. All known illumination means are suitable as illumination. Alternatively or additionally, a stroboscope can also be used. Several illuminations can be advantageous as well, such as, for example, LEDs, which are evenly distributed around the circumference of the inside of the detection apparatus at the level of the mist surface.

According to one embodiment, the detection apparatus comprises a nebulizer which is arranged inside the container or at a wall thereof, so that the nebulizer is in direct or indirect contact with a preferably dark colored liquid from which the mist can be formed.

Alternatively, the mist can also flow in through an opening in the bottom or in the side wall of the container. A further embodiment uses a material that vaporizes at room temperature such as dry ice for the generation of the mist, wherein it must be made sure that turbulences which are generated by the evaporation either take place outside the container, or settling of the mist can take place before the detection apparatus starts its actual operation. Also, solid particles that cannot dissolve, such as very fine powder or the same, can be used for generation of the mist.

According to a further embodiment of the detection apparatus, the container is hermetically sealed, or comprises a wind protector. Since the detection of infra sound frequently takes place in the open—in particular during spacious "zeroing in" on suspected infrasound sources—it must be made sure that natural air movements do not affect the mist surface. As long as the material of the container is not too thick or too tightly sealed to let the infrasound waves pass, the container can be closed, preferably with a transparent lid, in order to provide visibility of the mist surface.

A windscreen, however, can e.g. be achieved by a simple increase of the height of the sidewalls of the container, or by placing the detection apparatus inside a tent, a vehicle or the same which protects from air movements. In particular, as material for the windshield, a fabric or silk which is pervious to air, but windproof, and less preferable, an airtight plastic foil can be used. Optionally, the windshield is also impregnated against moistness/rain. It can be designed as a hood shaped cover which can be put as needed over the detection apparatus that is designed as framework.

Preferably, the detection apparatus has a video camera by means of which the mist surface can be recorded. A high resolution such as for example "full HD" (1080p) is preferred. The video data which are preferably present as digital information can then be fed forward without further processing.

The camera should be arranged such that it runs approximately vertical with respect to the propagation direction of the directed front. In the typical case of an approximately horizontally propagating front, the video camera must thus be attached above the container. Of course, an image field which corresponds to, or insignificantly exceeds or falls below, the size of the mist surface, is reasonable.

In particular in the case of the presence of digital video data, it is preferred that the detection apparatus has an image processing device to which the recorded image of the mist surface can be fed, and by which the image can be analyzed. In other words, the image processing device provides e.g. for the determination of the direction of the infrasound, stores all relevant data in a suitable memory, etc.

It is further preferred, that the detection apparatus comprises a device for the determination of the respective measurement site e.g. by means of GPS, and/or a device for the control of natural air movements e.g. by means of an anemometer, and/or a device for the control of the barometric pressure e.g. by means of a barometer.

In order to avoid repetitions, reference is made to the above explanations regarding this matter. The components can be present as individual devices, or they can be integrated into a complete system which particularly preferred takes over the image processing and further analysis of the data as well.

Further improvements relate to a marking which is visible to the user/the video camera, pointing into a certain cardinal direction (e.g. to the north). The detection apparatus preferably has posts which allow a setup in a normalized height, e.g. 1.20 m.

Furthermore, the invention relates to the usage of a previously described apparatus, i.e. an apparatus with a container which is partially filled in a way with a mist being embedded in a carrier medium such that a mist surface is present, for the detection of infrasound. In other words, the invention is based on the surprising insight that a container which comprises a mist surface is suitable for the detection of infrasound events. It is clear that the usage preferably relates to the usage of one of the aforementioned embodiments having further components (e.g. video camera, illumination, . . . ) for the detection of infrasound events.

The invention relates also to a locality determination system for the locality determination of an infrasound source. Such a locality determination system has, as its core, a multitude of detection apparatuses of the previously described type which is designed according to the invention. At least two, but preferably at least three of such detection apparatuses are therefore combined into one locality detection system.

It is clear that particularly preferred, according data connections, also via mobile radio, should be present between the individual detection apparatuses so that the gathered data can directly be fed forward to an analyzing device. Alternatively, the data can be gathered off-line as well and fed forward to an analyzing device after completion of the data acquisition, or they can be transferred in packets, for example hourly, to an accordingly equipped receiver unit. A memory card or an off-the-shelf USB stick can exemplarily be used for intermediate storage of the data.

The effect of such a locality detection system which consists of several detection apparatuses has already been described further above and is therefore not repeated.

For improving the detection- or locality detection result, respectively, the detection apparatus according to the invention or the locality detection system according to the invention, respectively, can be combined with the sound measurement which has also been described before. Accordingly, a detection apparatus according to the invention or a locality detection system according to the invention, respectively, comprises at least two sound measurement devices for sound which are designed and positioned as previously described, wherein their measurement results can be fed to an analyzing device for comparison of both measurement results. In other words, the measurement system is upgraded with the ability of the recording of sound at two measurements sites, and the additional measurement results are particularly preferred provided to a computer assisted analyzing device which can also be part of the measurement system, or which can only be assigned to the same.

The proposed invention solves the problems known from the art. It provides a cost effective detection method for infrasound, a locality detection method for infrasound sources, as well as an apparatus for carrying out these detection- or locality detection methods, respectively.

DETAILED DESCRIPTION OF PREFERRED EMBODIMENTS

Figure 1:
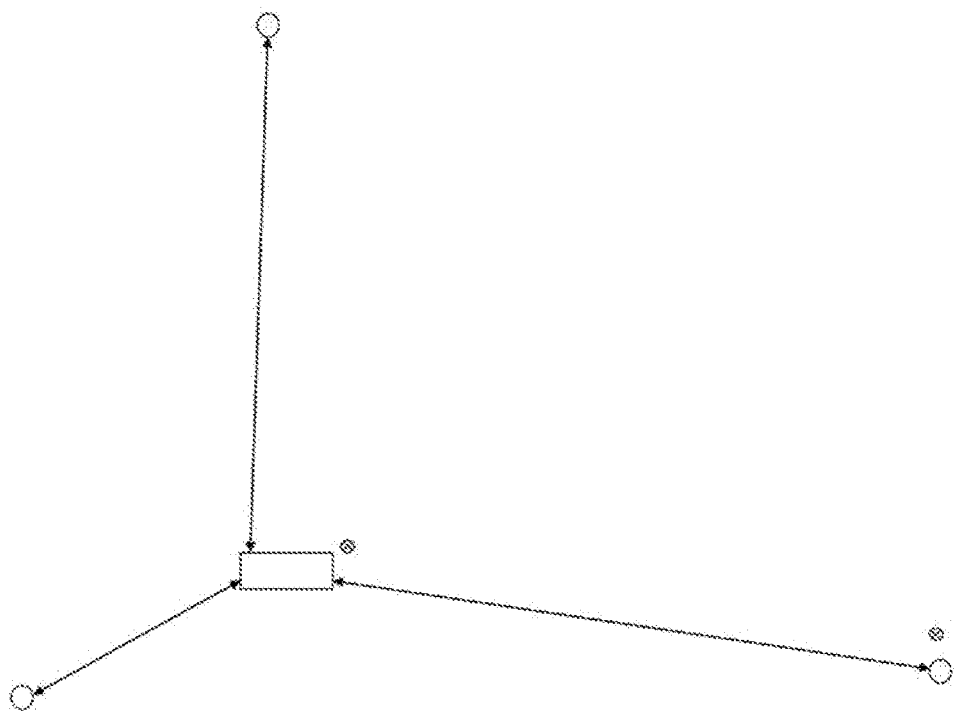
FIG. 1 shows a schematic arrangement of detection apparatuses for the locality detection of an infrasound source.

FIG. 1 shows how the locality detection of a suspected infrasound source is carried out with a multitude (here:

three) detection apparatuses which are represented as empty circles without reference numerals. The infra sound source is schematically represented by the square in the central region of the figure.

The double arrows of differing length indicate the different distances between infrasound source and detection apparatuses. The detection device which is shown in the lower left in the picture will detect an infrasound event earlier than the one which is shown at the top of the picture, and that one, in turn, later than the one which is shown in the right in the picture. The arrival times of the sound event are kept by means of timestamps. Typically, the propagation velocity of sound is known. Subsequently, by aid of the timestamps and with known detection sites, the position of the infrasound source can be deduced (see FIG. 2).

It is clear that the locality detection is also possible by means of the directed fronts of the individual detections, wherein at least two detections at spaced apart detection sites are necessary. If lines which are perpendicular to the respective fronts and which lie in the drawing plane are drawn in a map, their intersection indicates the (at least approximate) position of the infrasound source.

Additionally, two microphones for measuring sound are present as well (circles with cross). One of these sound measuring devices is arranged in close proximity to the sound source, for example 100 m away from the same. The latter is situated in close proximity to one of the three detection sites which are typically spaced apart several kilometers away from one another; presently to the one which is shown at the lower right in the picture. There, the distance amounts to only a few meters. The measurements of the sound events are recorded and can e.g. be filtered by means of fingerprint techniques out of the entire measurement, and be correlated to one another, after their time axes having been shifted in a manner such that the sound events are synchronized with each other.

Figure 2:
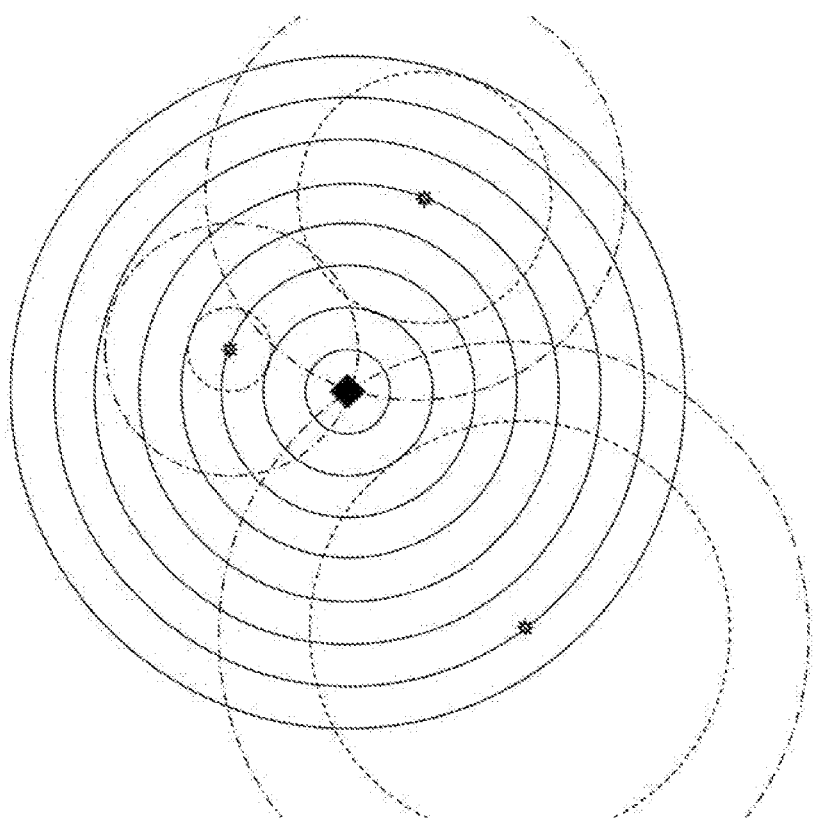
FIG. 2 shows a simple method for the locality detection by means of a position- and time stamp.

In FIG. 2 it is shown how in a simple manner a locality detection by means of the position- and timestamps of several detections can be carried out. In the center of the picture which must be regarded as a top view onto a map, the infrasound source is represented by a dark rhomb. Infrasound waves propagate uniformly from the same in all directions (continuously drawn circles). Three detection apparatuses are set up at different detection sites, represented as small star shaped objects.

At the time point $t_0=0$ the infrasound is generated. The distances of the wave fronts shall be 330 m. Then, the first wave front reaches the first detection apparatus in the left of the picture after $t_1=3$ s, the one at the top of the picture (2nd detection apparatus) after $t_2=5$ s, and the one at the bottom of the picture (3rd detection apparatus) after $t_3=7$ s. Thus, the timestamps of the detection apparatuses show all times which (with respect to other yet unknown initial time of the signal) are 3, 5 or 7 s later, respectively. If these timestamps would for example show $t_1^*=13$ s, $t_2^*=15$ s and $t_3^*=17$ s, the (initially unknown) timestamp of the source would actually lie at 10 s.

Thus, the task consists of finding the position of the source which "fits" to the time stamps of the detection apparatuses. For this, at first only tentatively, a (first) circle (dashed line) can be drawn around the first detection apparatus having a radius of 1·330 m (corresponding to a propagation time of the sound of 1 s). Around the second detection apparatus, a circle is drawn with a radius corresponding to the distance that the sound covers in a time of $(t_2^*-t_1^*)+1$ s=(15 s–13 s)+1 s=3 s, i.e. 990 m, corresponding to the distance of three wave fronts. In the same way, around the third detection apparatus, a circle is drawn with a radius corresponding to the distance that the sound covers in a time of $(t_3^*-t_1^*)+1$ s=(17 s–13 s)+1 s=5 s, i.e. 1650 m, corresponding to the distance of five wave fronts.

However, these circles which are shown in FIG. 2 all in dashed lines, do not yet have a common intersection.

Now, a further (second) circle is drawn around the first detection apparatus with a radius of 2·330 m=660 m (corresponding to a propagation time of the sound of 2·1 s). In analogy, according circles are drawn around the two other detection apparatuses (these three circles are not depicted). Here as well, no intersection results.

If now, however, one starts at the first detection apparatus with a radius of 3·330 m=990 m (corresponding to a propagation time of the sound of 3·1 s), one receives 5 s or 7 s for the two other detection apparatuses. Circles with these radii (drawn in dash-dotted lines) around the three detection apparatuses intersect just at the location of the infrasound source (black rhomb in the center of the picture).

It is clear that this task can also be solved automatically and/or in analytical ways. However, it is important that this method can be carried out even without taking into account the orientation of the wave fronts, whereby, however, the method according to the invention for the detection of the infrasound waves should be used; in particular, when no or just barely audible corresponding sound events are present.

Figure 3:
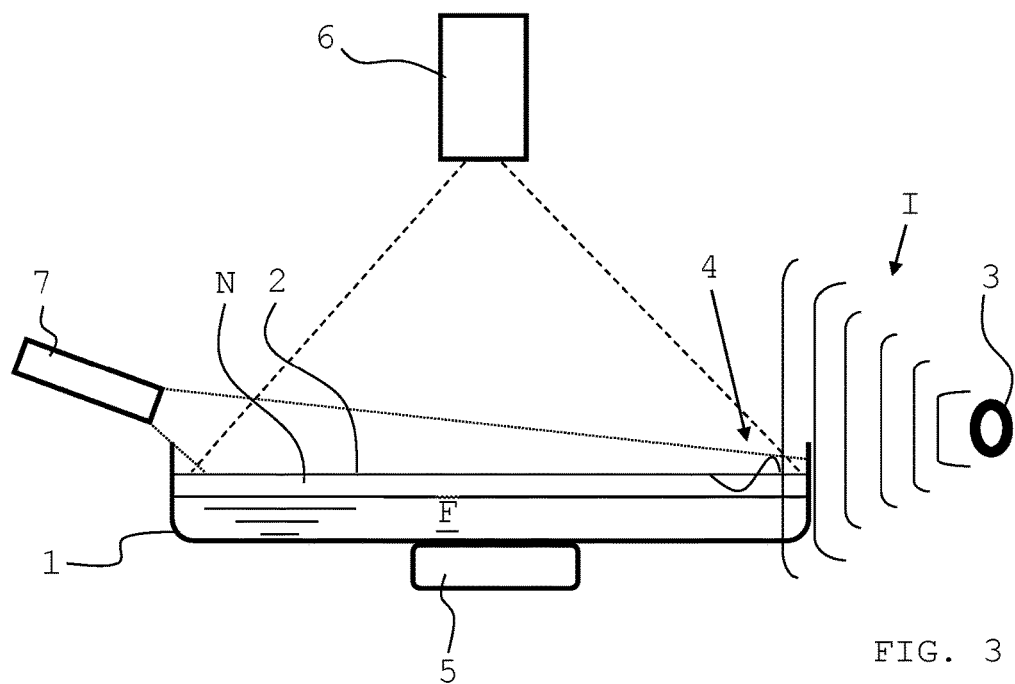
FIG. 3 shows a preferred embodiment of the detection apparatus according to the invention.

In FIG. 3, a preferred embodiment of the detection apparatus according to the invention is shown. It comprises a container 1 which is a basin in the depicted embodiment. Therein, a liquid F such as preferably water is present.

A nebulizer 5 is arranged at the bottom of the container 1. The nebulizer generates by means of vibration which goes through the wall a fine mist N above the liquid surface, the mist being embedded in a gaseous carrier medium, presently air. The mist has at its upper side a mist surface 2.

Infrasound I is emitted from a spaced apart infrasound source 3. The infrasound source 3 is arranged approximately in the same plane as the mist surface 2, i.e. being arranged substantially neither above nor below, but lateral, to the detection apparatus. The infrasound I results upon arrival in the detection apparatus in a directed front 4 which changes over time. The appearance of the front 4 depends on the strength and frequency of the infrasound I.

In order to enhance visibility of the front 4, the detection apparatus has an illumination 7. The same illuminates the mist surface 2 (radiation cone indicated by dotted lines). Preferably, the illumination 7 is arranged lateral to and slightly above the mist surface 2.

The detection apparatus further has a video camera 6. It is arranged such that, if possible, the entire mist surface 2 can be recorded (image region is indicated by dashed lines). Not shown are electric supplies for electric supply of the illumination 7, nebulizer 5 and video camera 6, or wires for the forwarding of the images to an also not depicted image processing device by means of which the recorded images can be analyzed.

Figure 4:
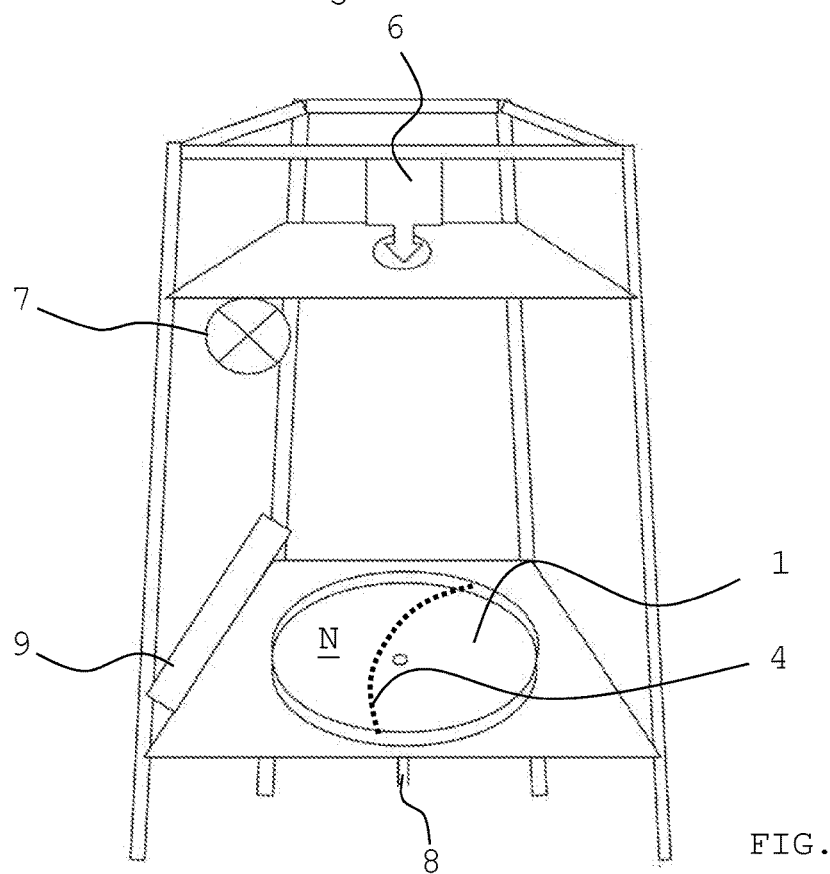
FIG. 4 shows an embodiment of the detection apparatus according to the invention in a perspective view.

FIG. 4 shows a perspective view of one embodiment of the detection apparatus according to the invention. It comprises a round container 1 which is filled with a mist N such that the mist surface (not depicted) forms according to the invention. Mist N is generated by a not depicted nebulizer outside the container 1 and fed via a mist inlet 8 into the container 1. Below the detection apparatus, space is provided for energy supply (accumulator, not shown). Above the container 1, the video camera 6 is arranged with line of sight towards the container 1. Angularly and above container 1, an illumination 7 is present for improving the visibility of the directed front 4 which moves through container 1 because of an arriving infrasound event (dotted line). Furthermore, the detection apparatus comprises a shelf 9 for instruments (time measurement, GPS, etc.).

Figure 5:
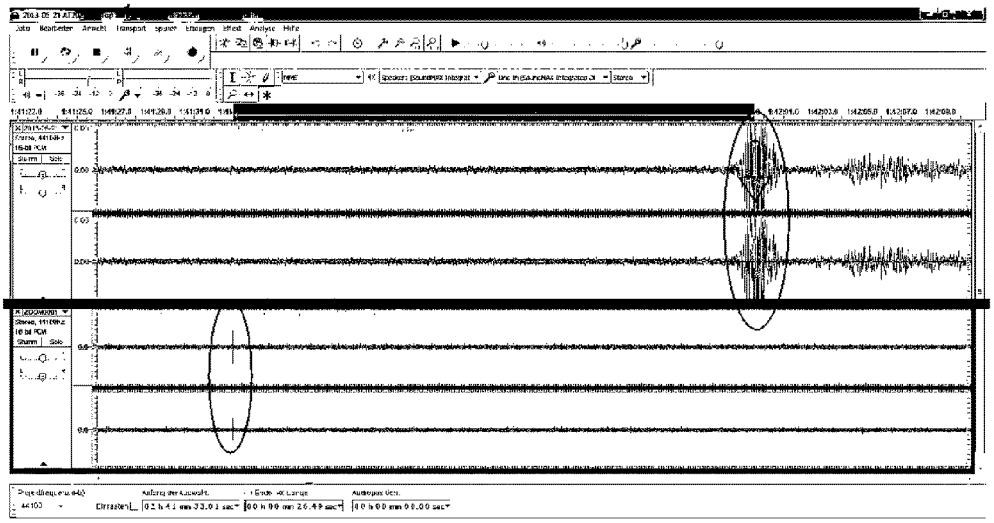
FIG. 5 shows the measurement results of two sound measurement devices before synchronization.
Figure 6:
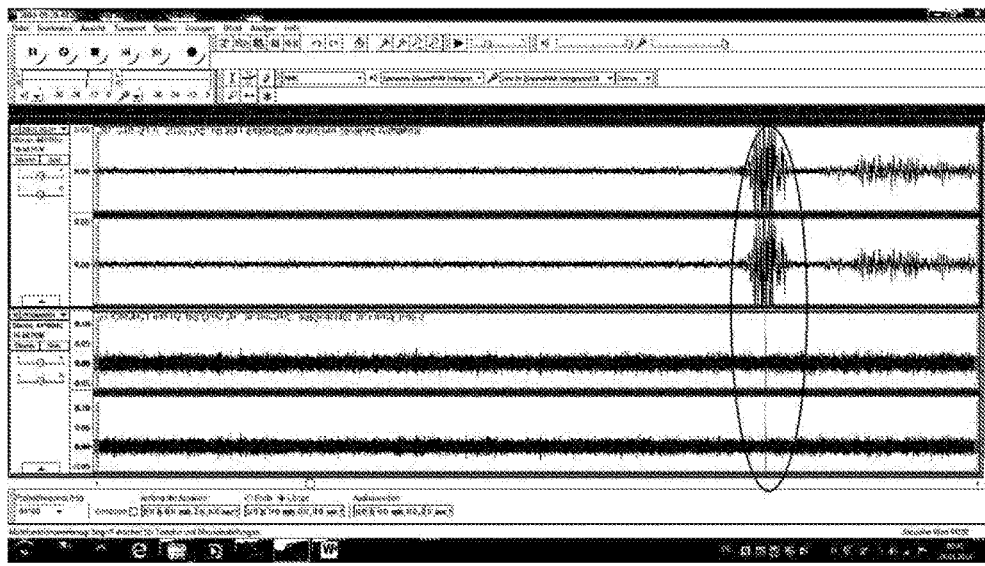
FIG. 6 shows the measurement results of two sound measurement devices after synchronization.

In FIG. 5, the measurement results of two sound measurement devices which supplement the detection apparatus are depicted one above the other. In y-direction, the amplitude is plotted, and in x-direction, the time. The regions circled by an oval result from the same sound event. By shifting the time axes, these two measurements can be represented synchronized with each other, as shown in FIG. 6. Due to the shifting, it is also possible to deduce the distance between both measurement sites.

The shifting can at first be theoretically calculated from the actual distance to the reference point (1st measurement site, at the infrasound source), together with the sound-propagation velocity. It is already possible to look for congruencies in these measurements that have been (pre-) synchronized this way. However, with increasing distance, factors such as wind, rain, barometric variations etc. will contribute to the fact that the calculated shifting must be post-adjusted in order to represent the congruent measurement results as actually being synchronized. For a time delay of 30 seconds (corresponding to a distance of approx. 10 km), the deviation of the calculated from the real value of the shifting amounts to 1-3 seconds. It usually grows with increasing distance, as long as the factors do not accidentally compensate each other.

Figure 7:
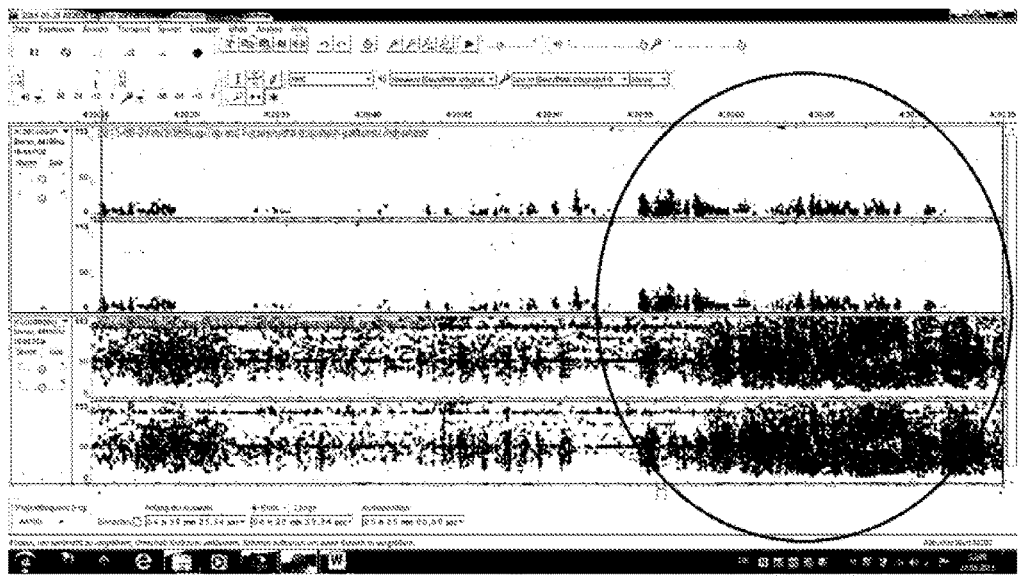
FIG. 7 shows two congruent fingerprints of two synchronized measurement results in the frequency spectrum.

In FIG. 7, it can be seen how a comparison (fingerprint) of measurement results is shown in the frequency spectrum. For the sake of better reproducibility, the contrast was increased, so that at least the relevant image regions are well visible. These are the spectra inside the circles, in the right of the picture, which are assigned to the same sound event that has been recorded at two different measurement sites (once close to the source, once far away from the same). The chronological sequence of the spectra and their transformations directly allows to draw this conclusion.

LIST OF REFERENCE NUMERALS

1 container
2 mist surface
3 infrasound source
4 front
5 nebulizer
6 video camera
7 illumination
8 mist inlet
9 shelf
I infrasound
N mist
F liquid

The invention claimed is:

1. A method for detecting infrasound at a measurement site, the method comprising:
    exposing a remote infrasound source to a container partially filled with a mist which is embedded in a carrier medium to change pressure over time, wherein the pressure change forms a directed front at a mist surface; and
    optically detecting mist at the directed front to identify the pressure change, thereby detecting infrasound.

2. The method according to claim 1, wherein the mist surface is illuminated.

3. The method according to claim 1, wherein the mist originates from a liquid nebulized by a nebulizer arranged inside the container or at a wall thereof.

4. The method according to claim 1, wherein the detection takes place over a certain period of time.

5. The method according to claim 4, wherein the mist surface (2) is recorded by means of a video camera (6).

6. The method according to claim 5, wherein pictures from the video camera are fed to an image processing device for calculating direction, strength, and/or frequency of the infrasound.

7. The method according to claim 1, further comprising determining a respective detection site, controlling natural air movements, and/or controlling barometric pressure.

8. A method for determining locality of an infrasound source, comprising:
    exposing a remote infrasound source to a container partially filled with a mist which is embedded in a carrier medium to change pressure over time, wherein the pressure change forms a directed front at a mist surface; and
    optically detecting the directed front at the mist surface simultaneously or time-delayed at different sites, wherein direction of the infrasound source is deduced from a position of the directed front of a respective detection result together with its according detection site.

9. The method according to claim 8, wherein the mist surfaces are recorded by video cameras (6) and fed in an image processing device for calculating direction of the infrasound source and/or the strength and/or the frequency of the infrasound at the respective detection site.

10. A method for detecting infrasound at a measurement site, the method comprising:
    exposing a remote infrasound source to a container partially filled with a mist which is embedded in a carrier medium to change pressure over time, wherein the pressure change forms a directed front at a mist surface;
    optically detecting the directed front at the mist surface;
    measuring sound by microphones which can detect a certain minimum frequency in the audible region and/or in the inaudible region at or above 3 Hz; and
    comparing the sound measurements by a fingerprinting method with respect to a time axis which is corrected with regard to sound events, the sound measurements being carried out at a first measurement site which has a distance from the infrasound source approximately corresponding to a wavelength of the minimum frequency, and at a second measurement site which is located a few meters away from the respectively corresponding measurement site.

11. An apparatus for detecting infrasound, comprising a container which is partially filled with a mist (N) embedded in a carrier medium such that a mist surface is present on which, when exposed to a remote infrasound source, over time, a directed front of the mist is formed and mist at the directed front is optically detectable to identify the presence of infrasound.

12. The apparatus according to claim 11, further comprising an illumination configured to illuminate the mist surface.

13. The apparatus according to claim 11, further comprising a nebulizer which is arranged inside the container or at a wall thereof, so that the nebulizer is in direct or indirect contact with a liquid from which the mist is formed.

14. The apparatus according to claim 11, wherein the container is hermetically sealed, or comprises a wind protector.

15. The apparatus according to claim 11, further comprising a video camera for recording the mist surface.

16. The apparatus according to claim 15, further comprising an image processing device to which the recorded image of the mist surface is fed, and by which the image is analyzed.

17. The apparatus according to claim 11, further comprising a device for one or more selected from the group consisting of determining the respective measurement site, controlling natural air movements, controlling the barometric pressure.

18. A system for determining locality of an infrasound source, comprising a multitude of detection apparatuses according to claim 11.

19. A system for determining locality of an infrasound source, with a multitude of detection apparatuses according to claim 11.

\* \* \* \* \*